United States Patent
Caruel et al.

(10) Patent No.: US 9,249,756 B2
(45) Date of Patent: Feb. 2, 2016

(54) ASSEMBLY FOR AN AIRCRAFT TURBOJET ENGINE COMPRISING A THRUST REVERSAL COWL

(75) Inventors: Pierre Caruel, Le Havre (FR); Guy Bernard Vauchel, Harfleur (FR); Jean-Philippe Joret, Beuzeville (FR); Andre Baillard, Bretteville du Grand Caux (FR)

(73) Assignee: AIRCELLE, Gonfreville L'Orcher (FR)

( * ) Notice: Subject to any disclaimer, the term of this patent is extended or adjusted under 35 U.S.C. 154(b) by 815 days.

(21) Appl. No.: 13/511,279

(22) PCT Filed: Nov. 25, 2010

(86) PCT No.: PCT/FR2010/052537
§ 371 (c)(1),
(2), (4) Date: May 22, 2012

(87) PCT Pub. No.: WO2011/067520
PCT Pub. Date: Jun. 9, 2011

(65) Prior Publication Data
US 2012/0228403 A1 Sep. 13, 2012

(30) Foreign Application Priority Data

Nov. 26, 2009 (FR) ..................................... 09 05687

(51) Int. Cl.
*F02K 1/72* (2006.01)
*F02K 1/76* (2006.01)
*B64D 29/06* (2006.01)

(52) U.S. Cl.
CPC . *F02K 1/766* (2013.01); *F02K 1/72* (2013.01); *B64D 29/06* (2013.01)

(58) Field of Classification Search
CPC ............... F02K 1/72; F02K 1/70; F02K 1/76; F02K 1/763; F02K 1/74; F02K 1/766; B64D 29/06
USPC .............................. 60/226.1–226.3, 770, 771; 239/265.11–265.43
See application file for complete search history.

(56) References Cited

U.S. PATENT DOCUMENTS 5,735,557 A * 4/1998 Harvey ......................... 292/216
6,021,636 A * 2/2000 Johnson et al. .............. 60/226.2

(Continued)

FOREIGN PATENT DOCUMENTS

| EP | 1286037 A1 | 2/2003 |
|---|---|---|
| EP | 1298309 A1 | 4/2003 |

(Continued)

OTHER PUBLICATIONS

International Search Report issued May 25, 2011 by European Patent Office re: PCT/FR2010/052537, pp. 3; citing: FR 2 916 426 A1, EP 1 286 037 A1, EP 1 298 309 A1, FR 2 914 700 A1, U.S. Pat. No. 7,484,356 B1.

*Primary Examiner* — Steven Sutherland
(74) *Attorney, Agent, or Firm* — Brinks Gilson & Lione

(57) ABSTRACT

The invention relates to an assembly for a turbojet engine which includes a pylon (1) and a nacelle supported by said pylon (1). Said nacelle (3) includes a grid thrust reverser (21) including an integral cowl mounted so as to slide on rails (15), which are arranged on both sides of said pylon (1), between a direct jet position and a thrust reversal position. Said assembly is characterized in that it includes means (23, 31) for blocking the sliding movement of the cowl on the rails (15), said means being inserted between the pylon (1) and the cowl.

7 Claims, 4 Drawing Sheets

(56) References Cited

U.S. PATENT DOCUMENTS 6,584,763 B2 7/2003 Lymons et al.
7,484,356 B1 2/2009 Lair
2004/0231317 A1* 11/2004 Dehu et al. ............... 60/223
2006/0101806 A1* 5/2006 Ahrendt ................. 60/226.2

FOREIGN PATENT DOCUMENTS

FR 2914700 A1 10/2008
FR 2916426 A1 11/2008

* cited by examiner

ASSEMBLY FOR AN AIRCRAFT TURBOJET ENGINE COMPRISING A THRUST REVERSAL COWL

TECHNICAL FIELD

The present invention relates to an assembly for an aircraft turbojet engine.

BRIEF DESCRIPTION OF RELATED ART

Known from the prior art, and in particular from document FR 2 916 426, is an assembly for a turbojet engine, comprising a pylon and a nacelle supported by said pylon, said nacelle comprising a grid thrust reverser comprising an integral cowl slidingly mounted on rails positioned on either side of said pylon between a direct jet position and a thrust reversal position.

"Integral cowl" refers to a cowl with a quasi-annular shape, extending from one end of the pylon to the other without interruption. Such a cowl is often designated using the Anglo-Saxon term "O-duct," in reference to the shroud shape of such a cowl, as opposed to a "D-duct," which in fact comprises two half-cowls each extending over a half-circumference of the nacelle.

In both cases, it is the withdrawal of the cowl by sliding along rails integral with the pylon that makes it possible to free the thrust reversal grids, and thus to implement the thrust reversal function.

It is of course crucial for such a sliding movement not to be able to occur at an inopportune time: such an opening would in fact be fatal during a flight phase.

For these reasons, safety bolts are provided at different locations of the thrust reverser to block unwanted opening of the cowl.

In a "D-duct" reverser, three safety bolts are traditionally provided for each half-cowl: two bolts acting directly on two actuating cylinders of each half-cowl, and a third bolt inserted between the so-called "six o'clock" beam (i.e. positioned in the lower portion of the nacelle and on which the two half-cowls are slidingly mounted) and the concerned half-cowl.

Independent power sources are provided for these bolts, so as to increase the reliability of the safety device.

The remote location of the third bolt relative to the other two offers increased security relative to a duct burst or a vane loss: in such a case, only one or two bolts may be destroyed, but not all of them.

In an "O-duct" reverser, by definition there is no six o'clock beam: the installation of a third bolt, as in a "D-duct" reverser, is therefore not possible.

BRIEF SUMMARY

The present invention therefore aims to allow the installation of the third safety bolts in an "O-duct" reverser that provides the same degree of reliability and safety as that of a "D-duct" reverser.

This aim of the invention is achieved with an assembly for a turbojet engine which includes a pylon and nacelle supported by said pylon, said nacelle including a grid thrust reverser including an integral cowl mounted so as to slide on rails, which are arranged on both sides of said pylon, between a direct jet position and a thrust reversal position, said propulsion assembly being remarkable in that it includes means for locking the sliding movement of the cowl on the rails, said means being inserted between the pylon and the cowl.

The presence of these locking means in the interface area between the cowl and the pylon makes it possible to perform locking that is mechanically and geographically independent of that done in the actuating cylinders of the cowl, thereby offering the desired degrees of reliability and security.

According to other optional features of this assembly according to the invention:
  said locking means comprise a bolt comprising a body and a strike articulated on said body on the one hand, and on the other hand a locking member capable of cooperating with said strike: such a bolt is in particular used as the third bolt in "D-duct" thrust reversers, and does not require any particular adaptation to be used in an "O-duct" reverser;
  said bolt body is mounted inside said pylon, the strike passing through an opening formed in the pylon, and the locking member is secured to the cowl: this arrangement makes it possible to use the space available inside the pylon to install the bolt therein;
  the bolt body is mounted inside the cowl, said strike passing through an opening formed in the cowl, and said locking member is secured with said pylon: this arrangement is symmetrical relative to the previous one;
  the locking means are comprised in the thickness of the structure of said cowl;
  electric power cables are provided for said bolt that have an excess length: this excess length allows the bolt to move with the cowl while remaining electrically connected;
  electric power cables are provided for said bolt that can be disconnected from the stationary structure of the nacelle when said cowl goes from its direct jet position to its thrust reversal position: this arrangement makes it possible to do away with the aforementioned excess length, while allowing the bolt to be electrically connected in the position of the cowl where said bolt needs to be actuated, i.e. the closed position of said cowl;
  said grids are slidingly mounted on other rails positioned on either side of the pylon, between a usage position and a maintenance position, said rails being radially and circumferentially offset relative to the sliding rails of said integral cowl: this sliding of the grid makes it possible to access the engine portions located under said grids; the offset of the sliding rail of said grids allows them to be moved without interfering with the bolts of the cowl;
  circumferential play is provided between the locking member and the strike in the unlocked position: this play makes it possible to guarantee the possibility of sliding of the cowl once the strike is unlocked;
  said bolt comprises a blocking pin of the locking system of said strike, which can be manually removed: this pin makes it possible to inhibit the thrust reversal function, which may be desirable for example when the thrust reverser is malfunctioning and one nevertheless wishes for the aircraft to be able to fly.

BRIEF DESCRIPTION OF THE DRAWINGS

Other features and advantages of the present invention will appear upon reading the following description, and in reference to the appended drawings, in which.

DETAILED DESCRIPTION

Figure 1:
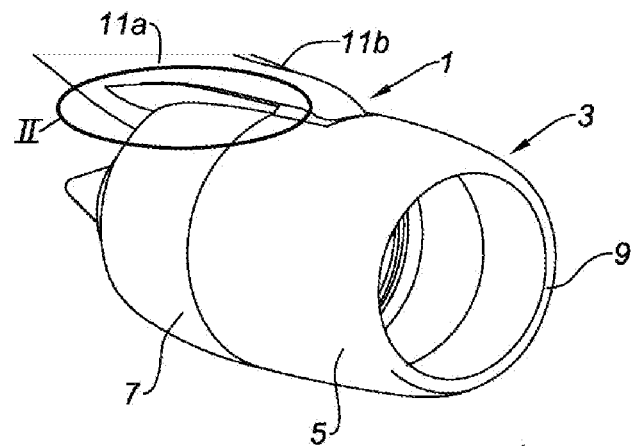
FIG. 1 is a perspective view of a propulsion assembly according to the invention.

In reference to FIGS. 1, an assembly for an aircraft turbojet engine is shown, comprising a pylon 1 and, suspended from said pylon, a nacelle 3.

As is known in itself, said nacelle 3 typically comprises an upstream cowl 5 and a downstream cowl 7, upstream and downstream being understood relative to the flow of air passing through the nacelle.

In the particular case illustrated, the upstream cowl 5 also forms an air intake 9 of the nacelle.

The downstream cowl 7 is slidingly mounted between the position shown in FIG. 1, called the "direct jet" position, corresponding to a situation where the aircraft is in flight, and a position slid in the downstream direction of the nacelle, making it possible to perform a thrust reversal function by discharging part of the air passing through the nacelle 9 upstream thereof.

The thrust reverser shown in FIG. 1 is of the "O-duct" type, i.e. the sliding cowl 7 forms a substantially annular integral piece extending without interruption from one side 11a of the pylon 1 to the opposite side 11b of said pylon.

The appended FIGS. 2 to 6 show a first embodiment of the invention.

Figure 2:
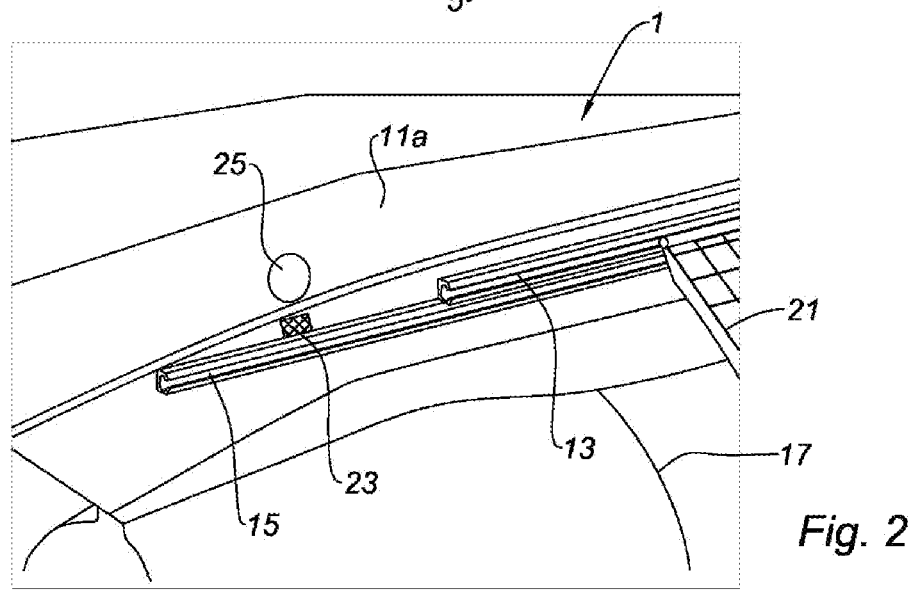
FIG. 2 is a perspective view of zone II of FIG. 1, the cowl of the thrust reverser having been removed.
Figure 3:
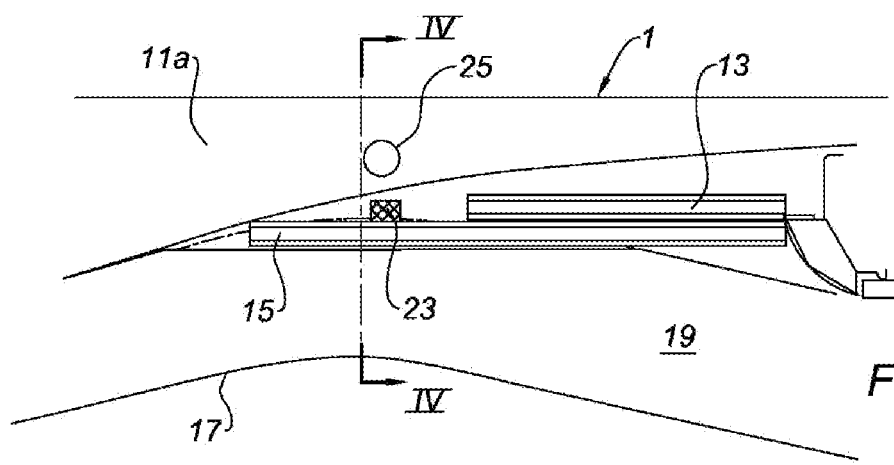
FIG. 3 is a side view of the zone of FIG. 2.

In FIGS. 2 and 3, which refer to zone II of FIG. 1 once the sliding cowl 7 has been removed, the pylon 1 is shown and, on the side 11a of said pylon, a short rail 13 and a long rail 15.

These two figures also show the inner structure 17 surrounding the turbojet engine, defining the cold air tunnel 19.

The short rail 13 allows the thrust reversal grids 21 to slide between a usage position shown in FIG. 2, and a maintenance position in which said grids are slid to the back end of the short rail 13, so as to allow access to the turbojet engine.

The long rail 15 and its counterpart positioned on the other side of the pylon 1 allow the cowl 7 to slide between its "direct jet" position and its thrust reversal position in which it frees the thrust reversal grids 21, allowing part of the air flow circulating in the tunnel 19 to be oriented toward the front of the nacelle.

A bolt 23 is mounted inside the pylon 1, a hatch 25 formed on the side 11a of the pylon 1 making it possible to access said bolt 23.

Figure 4:
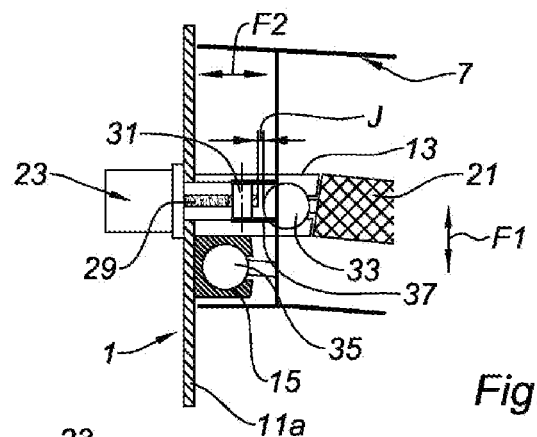
FIG. 4 is a cross-sectional view of the members shown in FIG. 3, along line IV of that figure.
Figure 5:
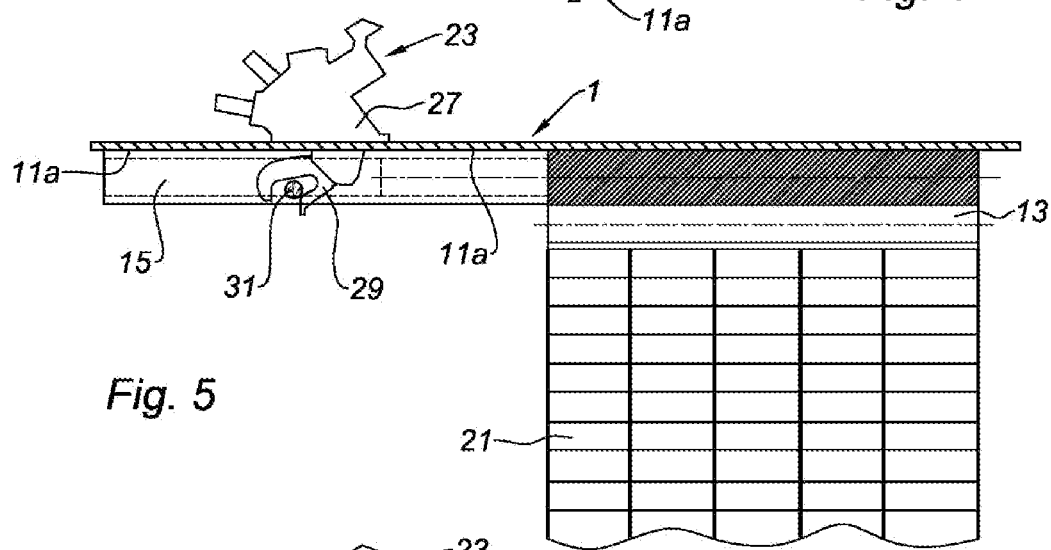
FIGS. 5 and 6 are top views of the zone of FIGS. 2 and 3, the thrust reversal grids respectively being in the usage and maintenance positions, and the locking means respectively being in the locked and unlocked positions.
Figure 6:
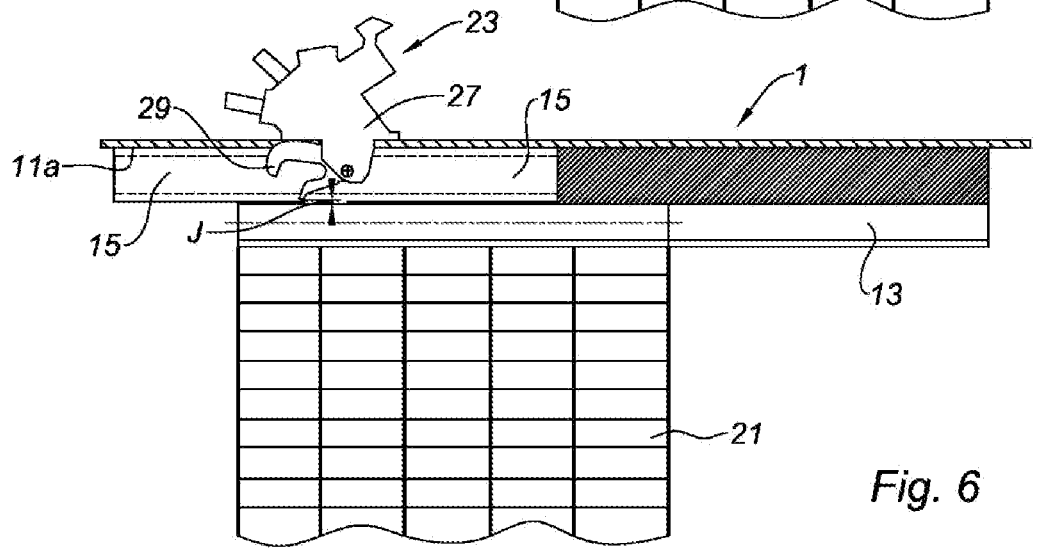

In reference to FIGS. 4 to 6, it is shown that the bolt 23 comprises a body 27 on which a strike 29 is pivotably mounted, under the action of an electric motor housed inside said body 27.

The body 27 fixed on the inner surface of the side 11a of the pylon 1 and the strike 29 pass through the wall forming said side 11a to cooperate with a locking member 31 secured to said sliding cowl 7.

In FIG. 5, the thrust reversal means 21 are shown in the in use position, and the sliding cowl (only the locking member 31 of which is visible) is shown in the "direct jet" position: in this position, said sliding cowl covers the thrust reversal grids 21, and the strike 29 of the bolt 23 blocks the locking member 31 relative to a movement toward the back of the sliding cowl, i.e. to the left of the figure.

In FIGS. 4 and 6, the thrust reversal grids 21 are shown in the maintenance position, i.e. they have slid toward the back (to the left of FIG. 6) relative to the situation of FIG. 5.

The sliding cowl 7 is in the thrust reversal position, i.e. withdrawn toward the back of the nacelle, this movement being allowed by the pivoting of the strike 29 of the bolt 23 toward the pylon 1, making it possible to release the locking member 31 of the sliding cowl.

As shown in FIG. 4, the short rail 13 of the thrust reversal grids 21 and the associated crosshead 33 of said grids are offset both radially (i.e. in the direction of arrow F1) and circumferentially (i.e. in the direction of arrow F2) relative to the long rail 15 and the associated crosshead 35 of the sliding cowl 7.

More specifically, play J (see FIGS. 4 and 6) is provided between the crosshead 33 of the grids 21 and the strike 29 in the open position.

The operating mode advantages of the propulsion assembly described above result from the preceding.

In direct jet operation, the thrust reversal grids 21 and the sliding cowl 7 are therefore in the upstream position on their respective rails 13 and 15, as shown in FIG. 5, and any inopportune sliding of the cowl 7 in the downstream direction of the nacelle is prevented by the cooperation of the strike 29 with the bolt 31.

When one wishes to actuate the thrust reverser, during landing of an aircraft, one first pivots the strike 29 toward the side 11 a of the pylon 1, so as to bring it into the position shown in FIGS. 4 and 6: in this position, the locking member 31 is released, and the actuating cylinders of the cowl 7 (not shown) can make the latter part slide in the downstream direction of the nacelle, i.e. to the left in FIG. 6, so as to expose the thrust reversal grids 21, and thereby discharge part of the cold air flow circulating in the tunnel 19 toward the front of the nacelle (see FIG. 3).

This thrust reversal position also makes it possible to perform the maintenance operations of the engine located inside the nacelle.

To that end, it is also necessary to slide the thrust reversal grids 21 in the downstream direction of their rails 13, so as to bring them into the position shown in FIG. 6.

Owing to the play J that exists between the crosshead 33 of these grids and the strike 29 in the unlocked position, this sliding movement of the grids 21 can be done without blocking by the bolts 23.

It should also be noted that the radial stepping (i.e. in direction F1 of FIG. 4) of the crosshead 33 of the grids 21 and 35 of the cowl 7 makes it possible to obtain the necessary travels for the movements of each of these members.

The circumferential stepping (arrow F2 in FIG. 4) makes it possible to move the crosshead 33 without blocking by the bolt 23.

Of course, with the aim of obtaining the maximum effective surface for the thrust reversal grids 21, it is desirable to minimize the distance between the crossheads 33 and the side 11 a of the pylon 1, and the locking member 31 and the associated fitting 37 connecting to the cowl 7 will in particular be sized so that said fitting is situated as close as possible to the side 11a of the pylon 1.

The embodiment just described makes it possible to obtain a third bolt positioned in the sliding zone of the cowl 7 relative to the pylon 1, remote from the bolts acting on the actuating cylinders of the cowl 7, and which can be powered by a completely independent power source.

In this way, excellent security and reliability are obtained relative to a risk of untimely opening of the sliding cowl.

Figure 7:
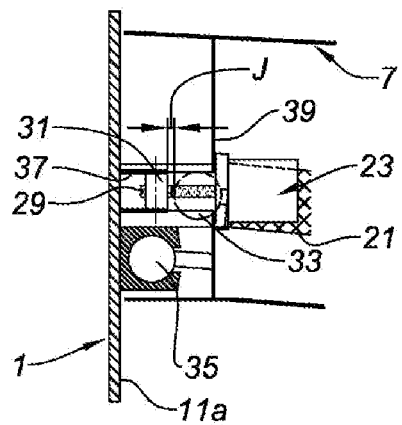
FIG. 7 is a view similar to that of FIG. 4 of another embodiment of the invention.
Figure 8:
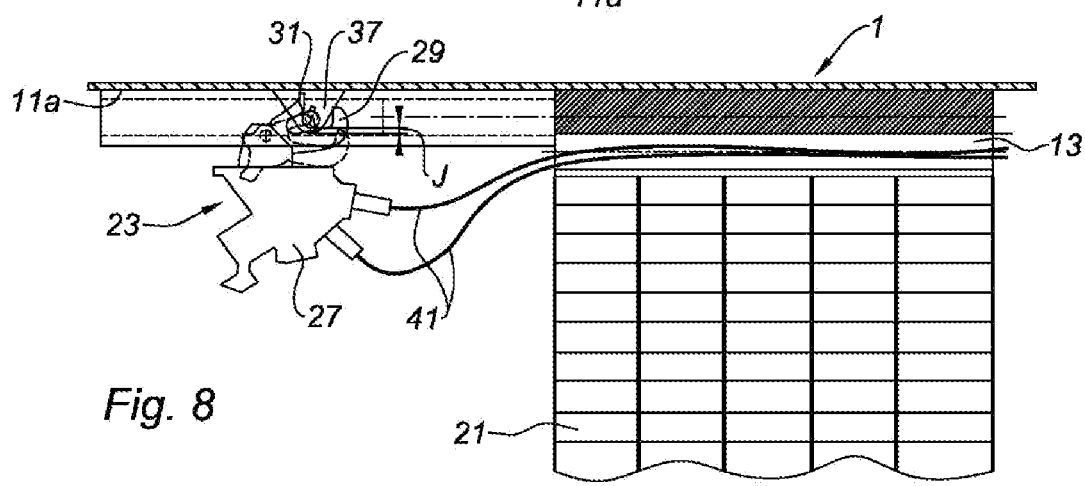
FIG. 8 is a view similar to that of FIG. 5 of said other embodiment.

FIGS. 7 and 8, which are respectively similar to FIGS. 4 and 5, show a second embodiment that differs from the preceding embodiment in that the bolt 23 is positioned inside the sliding cowl 7, fixed on an inner wall 39 thereof.

The locking member 31 and its associated fitting 37 are fixed on the side 11a of the pylon 1.

As before, play J is provided between the strike 29 in the open position and the locking member 31.

Inasmuch as, in that case, the bolt 23 moves with the sliding cowl 7, it is necessary to provide that the electric power cables 41 of that bolt, connected to a stationary part of the nacelle, have an excess length, as shown in FIG. 8.

Figure 9:
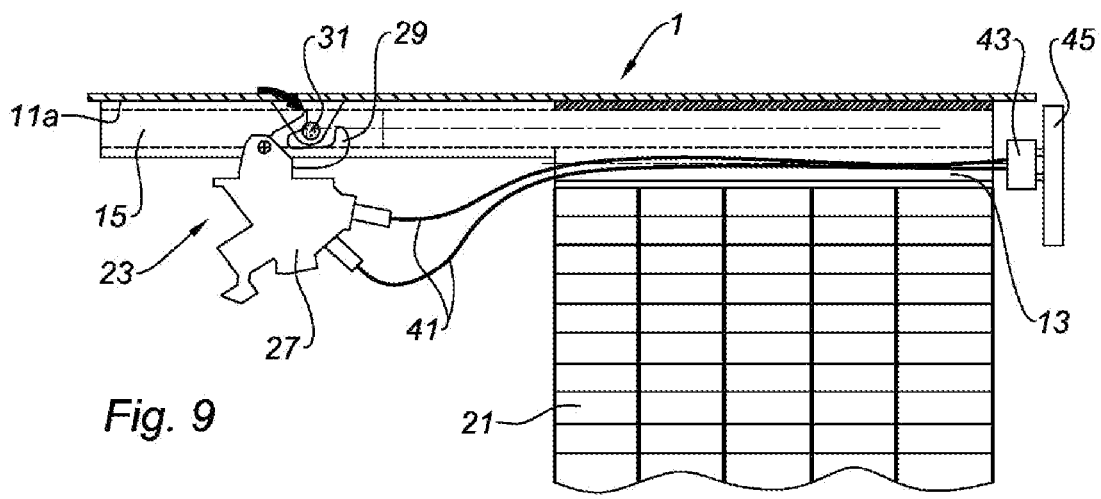
FIGS. 9 and 10 are views of an alternative of said other embodiment, the cowl of the thrust reverser being respectively in the direct jet and thrust reversal positions, and the locking means consequently respectively being in the locked and unlocked positions, and FIGS. 11 and 12, similar to FIGS. 4 and 7, show manual blocking means of the bolt according to the invention, respectively for the two aforementioned embodiments.
Figure 10:
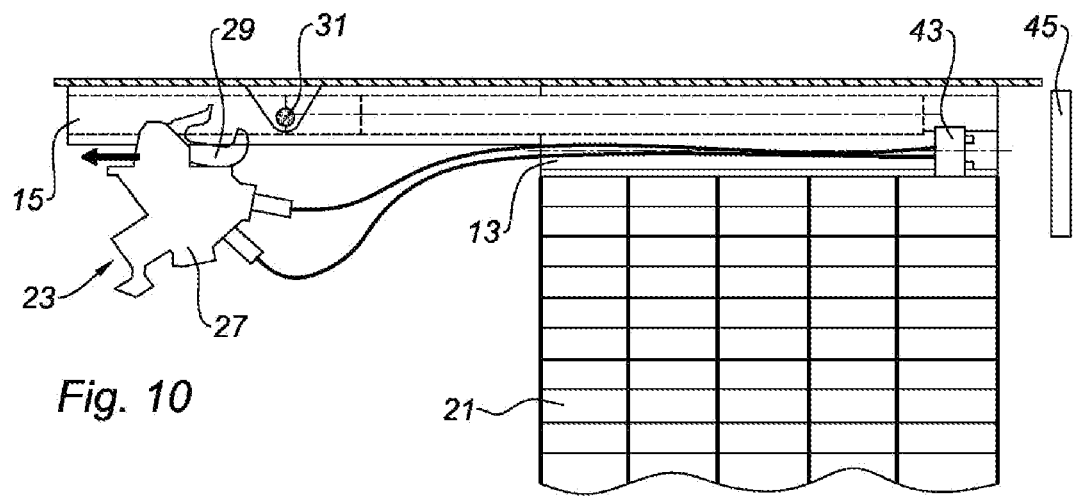

According to one alternative shown in FIGS. 9 and 10, in which the assembly according to the invention is respectively shown when the sliding cowl is in the "direct jet" position and in the thrust reversal position, it can be provided for the electric cables 41 to be connected to a plug 43 that disconnects from a corresponding plug 45, the latter part being mounted on the stationary part of the nacelle.

In fact, the need to be able to actuate the bolts 23 only occurs when the sliding cowl 7 is in the direct jet position, such a need disappearing once the unlocking has been done and the cowl moves toward its thrust reversal position.

For each of the embodiments described above, it is possible to consider means for prohibiting the movement of the strike of the bolt 23, which can in particular comprise a blocking pin 43 whereof the head 45 is positioned so as to remain visible from the outside.

Figure 11:
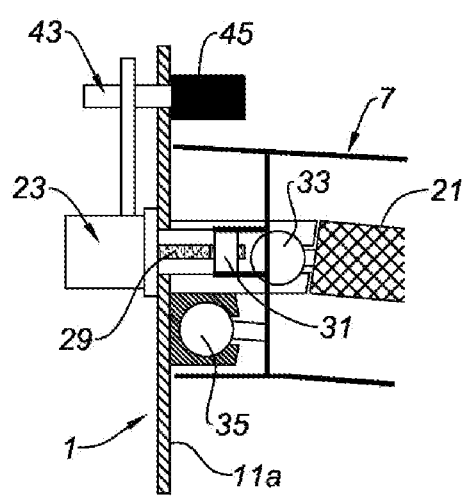

In the first embodiment, as shown in FIG. 11, the pin 43 passes through the side 11a of the pylon 1, for example locking a lever, belonging to the bolt, acting on the internal mechanics of the bolt, and its head 45 remains visible outside said side.

Figure 12:
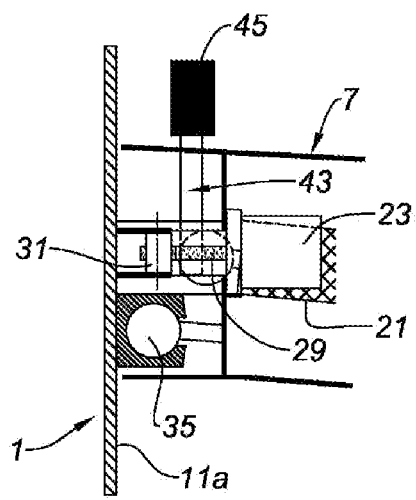

In the second embodiment, as shown in FIG. 12, the pin 43 passes through the cowl 7 and for example directly locks the locking mechanics of the strike, and its head 45 remains visible outside said cowl.

Of course, the present invention is in no way limited to the embodiments described and illustrated, which are provided only as examples.

The invention claimed is:

1. An assembly for a turbojet engine, including a pylon and nacelle supported by said pylon, said nacelle including a grid thrust reverser including an integral cowl mounted so as to slide on rails, which are arranged on both sides of said pylon, between a direct jet position and a thrust reversal position, said assembly comprising means for locking the sliding movement of the integral cowl on the rails, said locking means being inserted between the pylon and the cowl, wherein said locking means comprise a bolt comprising a body and a strike articulated on said body and a locking member capable of cooperating with said strike, and wherein said body is mounted inside said pylon, and the strike passing through an opening formed in said pylon, and the locking member is secured to the cowl.

2. The assembly according to claim 1, wherein the locking means are comprised in a thickness of a structure of said cowl.

3. The assembly according to claim 1, wherein electric power cables are provided for said bolt that have an excess length.

4. The assembly according to claim 1, wherein electric power cables are provided for said bolt configured to be disconnected from a stationary structure of the nacelle when said cowl goes from the direct jet position to the thrust reversal position.

5. The assembly according to claim 1, wherein grids are slidingly mounted on other rails positioned on either side of the pylon, between a usage position and a maintenance position, said other rails being radially and circumferentially offset relative to the sliding rails of said integral cowl.

6. The assembly according to claim 5, wherein circumferential play is provided between the locking member and the strike in an unlocked position.

7. The assembly according to claim 1, wherein said bolt comprises a blocking pin of a locking system of said strike, which is configured to be manually removed.

* * * * *